Sept. 27, 1927.
O. MILLER
1,643,674
ENGINE LUBRICATING SYSTEM
Filed May 20, 1926
2 Sheets-Sheet 1
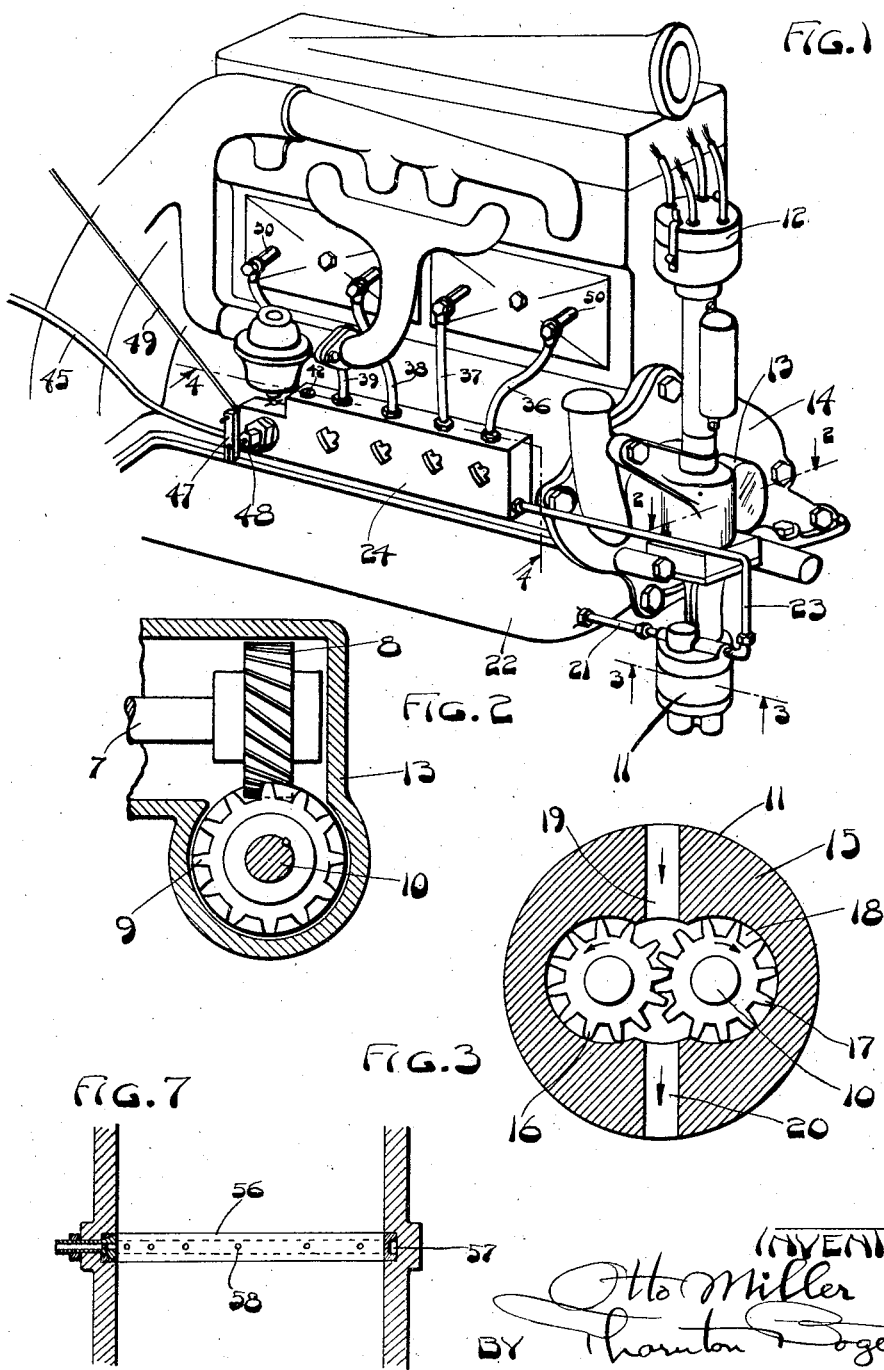
INVENTOR
Otto Miller
BY Thornton Bogert
ATTORNEY Sept. 27, 1927.  O. MILLER  1,643,674
ENGINE LUBRICATING SYSTEM
Filed May 20, 1926   2 Sheets-Sheet 2
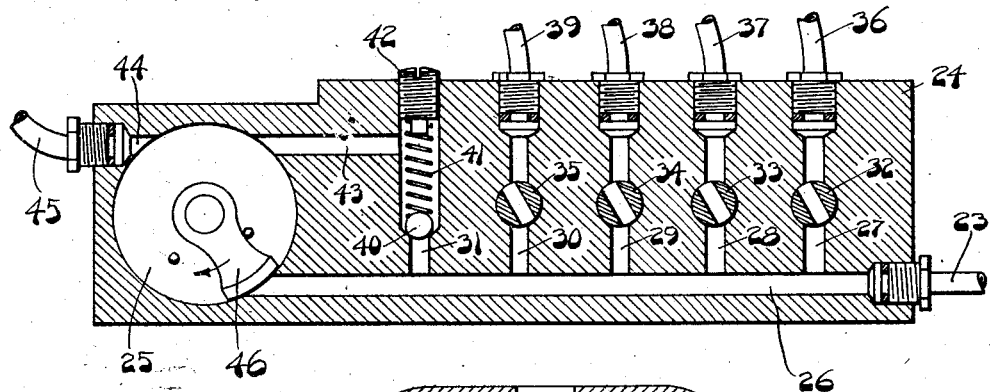
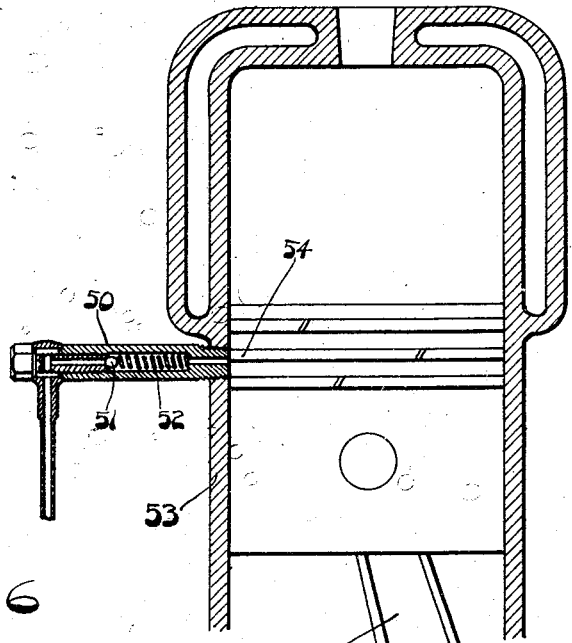
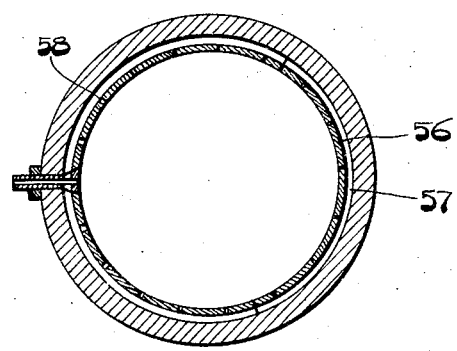
INVENTOR
Otto Miller
BY Thornton Bogert
ATTORNEY Patented Sept. 27, 1927.

1,643,674

UNITED STATES PATENT OFFICE.

OTTO MILLER, OF CINCINNATI, OHIO.

ENGINE-LUBRICATING SYSTEM.

Application filed May 20, 1926. Serial No. 110,461.

This invention has been particularly devised for the purpose of overcoming certain faults in the lubrication of engines of the internal combustion type, and has especial relation to the lubrication of the cylinder and piston walls of the engine. In internal combustion engines the proper lubrication of cylinder and piston walls is a more or less difficult accomplishment under the present systems employed. This is largely because of the great pressure which is brought to bear on the side of the cylinder and piston when angular position of the connecting rod occurs in turning the crank shaft in response to the pressure exerted on the piston as a result of the explosion above it. Such an excessive pressure causes most of the oil which exists between the two surfaces to be squeezed out and thereby starves these surfaces so that excessive wear and considerable loss of power occurs. Another fault frequently encountered in the lubricating of the cylinder and piston walls of internal combustion engines is that when there is an aggregate of more vacuum than pressure above the piston during a period of operation of the engine, as for example when the engine is idling, the oil which is brought up from the crank case is frequently brought up above the piston until the spark plugs are fouled, carbonization becomes heavy and the piston rings become stuck in their grooves because of the formation of carbon. This is commonly known as oil pumping. Still another fault occurs when the engine is operating under a prolonged load for any period of its operation. This occasions an aggregate of more pressure than vacuum above the piston and then operates to force the oil away from the piston and cylinder walls, thereby leading to starving or drying the walls. This drying is also accentuated by the excessive heat produced during the explosion. It is thus readily seen that excessive friction is set up and power is not only cut down but destructive wear is occasioned.

An object of this invention is to assure positive lubrication of the piston and cylinder surfaces by subjecting these surfaces to a film of oil which has been placed between them under pressure.

A further object of this invention is to produce a device which will subject the cylinder and piston surfaces to a necessary amount of oil at all times and especially under conditions of great load upon the engine wherein not only are these surfaces pressed together with greater pressure, but also wherein the greater amount of fuel used will cause less oil to be supplied to these surfaces on account of the consequently greater pressure created by the more violent combustion which tends to force the oil away.

These and other objects are attained in the device which I will now describe and which is illustrated in the accompanying drawings, in which:

Fig. 1 is a perspective view of an internal combustion engine of the automobile type, equipped with a device embodying my invention.

Fig. 2 is a fragmentary sectional view on the line 2—2 of Fig. 1 to show the means I employ for driving the oil pump constituting a detail of my invention.

Fig. 3 is a sectional view taken on the line 3—3 of Fig. 1, showing the mechanism of the oil pump to which I have referred.

Fig. 4 is a longitudinal sectional view of the distributor and pressure regulator manifold, taken on the line 4—4 of Fig. 1.

Fig. 5 is a sectional elevation of an engine cylinder equipped with a portion of the device embodying my invention.

Fig. 6 is a fragmental sectional plan view illustrating a modification of the arrangement shown in Fig. 5.

Fig. 7 is a fragmental sectional elevational view showing the modification shown in Fig. 6.

In the embodiment of the device I have illustrated, the engine, if not already equipped with an oil pump capable of delivering oil at a pressure of not less than 25 pounds to parts of the engine, may be so equipped by utilizing the end of the crank shaft 7 for mounting a gear 8, see Fig. 2, which drives a cooperating gear 9 upon a shaft 10 which serves conveniently to drive the pump 11 and commutator 12, see Fig. 1. A casing 13 encloses gears 8 and 9 and may be formed as a part of the end plate 14 of the crank case. The oil pump is driven from shaft 10, as has been said, and constitutes a casing 15 which has a chamber in which two gears 16 and 17 rotate. The gear 17, being mounted on shaft 10, drives gear 16 as an idler, but, each gear operating as a close fit in its end of the chamber 18, serves, as in the usual gear pump, to take oil from the oil inlet 19, to carry it around in the pockets formed between adjacent gear teeth, and to discharge it through the outlet 20 by squeezing it from the teeth as the two gears intermesh. Connected with the inlet 19 is a pipe 21 which taps into the crank case 22 to draw oil therefrom, while connected with outlet 20 is pipe 23 which leads to and is connected with an oil distributing and pressure regulating header or manifold 24.

Manifolding header 24 is preferably a block or casing having a chamber 25 at one end which is connected with a channel 26 having connection with pipe 23 at the opposite end of the casing. Leading off from channel 26 are a series of channels 27, 28, 29, 30 and 31 which communicate with the top of the casing. Channels 27 to 30 inclusive contain flow regulating valves 32 to 35 inclusive and have connected to their upper ends a series of pipes 36 to 39 inclusive respectively. Channel 31 contains a valve 40 which is held on its seat yieldingly by a spring 41 which is subjected to regulable tension by an adjustable plug 42 so that the valve may open under different tensions. The outlet of channel 31 is a by pass channel 43 which communicates with chamber 25. There is an outlet from chamber 25 which communicates with a discharge pipe 45. Within chamber 25 a valve 46 is arranged to travel in a circular movement in close contact with the circular peripheral wall of the chamber so that the opening of channel 26 into chamber 25 may be increased or decreased. A handle 47 on valve stem 48 and controlled by a rod 49, affords control of the valve from a convenient point, as for example the dash or instrument board of an automobile.

And now, pipes 36 to 39 inclusive, which have been mentioned, are each connected with a cylinder 53 by means of a connection 50, see Fig. 5, containing a check valve 51 which is held to its seat by a spring 52 as shown. Through this connection oil is admitted to the interior of each cylinder, against the co-operating piston wall 54, and preferably on the side against which the piston bears most heavily in exerting a crank rotating pressure upon the connecting rod 55. The position occupied by the connection 50 must be such that at no time, either when the piston occupies the upper or the lower extreme positions of its travel, will the oil ducts into the cylinder be uncovered, otherwise the oil will be merely pumped into open space and no pressure will exist throughout the system sufficient to force oil between the cylinder and piston walls when the piston does cover the oil duct. Discharge pipe 45 from manifold 24 may be led back to the crank case directly or, as is true in some motor car designs, this pipe may be placed to discharge upon, into or between other portions of the car mechanism which are directly connected with the engine crank case or oil reservoir, as for example gears, clutch discs, bearings and similar parts needing efficient lubrication. In Figs. 6 and 7, I have shown a slight modification of the very simple construction disclosed in Fig. 5, by providing in the cylinder wall a ring 56 which has its inner wall flush with or contiguous with the cylinder wall. This ring has an annular groove 57 in its outer wall which forms with the cylinder an enclosed channel which communicates with the oil check valve connection 50. Thus oil is permitted to form an annular reservoir entirely encompassing the ring through which it is fed by providing the ring with a series of ducts 58 of varying sizes, the larger being located at the point where the greatest pressure is brought to bear upon the cylinder wall by the piston, while gradual decrease in size of these ducts is brought about on each side of the larger duct or ducts until the diametrically opposite point in the ring is reached. Thus an amount of oil may be fed through these ducts in a nicely balanced ratio to the cooperating surfaces of the cylinder and piston in accordance with the direct bearing pressure exerted thereon. Although I have shown and described forms of the invention in which the oil is fed from the wall of the cylinder it is quite obvious that it may as readily be fed from the wall of the piston by some such a scheme as I have shown as applied to the cylinder. Such an inner feed oiling scheme would be especially applicable to types of engines employing the sliding sleeve valve which occupies a position between the cylinder and piston.

The operation of my improved oiling device will now be described. It will be assumed that the engine is operating in the usual manner. The pump 11 is thus in operation, as has been described, drawing oil from the crank case 22 through pipe 21 and discharging it through pipe 23 into channel 26 of manifold 24. Let us assume that the conditions under which the engine is operating are of light load and that lubrication such as my device provides may not be necessary. In this event the valve 46 may be moved in the direction of the arrow in Fig. 4 and thus allow free circulation through chamber 25 and out through pipe 45. Now should the load upon the engine increase so as to necessitate a wider opening of the throttle and thereby occasion a greater explosive pressure being brought to bear upon the engine piston, with a consequently greater pressure of one side of the piston against the cooperating side of the cylinder wall, the valve 46, may be moved to close the channel 26 as much as necessary in order to force the oil through branch channels 27 to 30 inclusive. In order that the proper amount of oil may be passed through each of these channels for the individual cylinders to thus be served, the regulating valves 32 to 35 inclusive will have to be regulated. And now should the load increase greatly the valve 46 may be completely closed, thus stopping channel 26 and forcing all the oil through channels 27, 28, 29 and 30 which the cylinders connected therewith will take, with the surplus being by-passed through channel 31, valve 40, and channel 43 and thence into channel 25 and pipe 45. By now regulating the spring pressure upon valve 40, by means of plug 42, the amount of oil thus by-passed may be regulated. Thus the proper amount of oil to each of the cylinders and at a pressure necessary to assume its delivery is rendered available by the simple adjustment of the valve 46 in accordance with the degree of opening of the throttle and the consequent pressure of the bearing side of the piston against the cylinder wall. While the control of the valve 46 may be independent of that of the throttle it is quite possible to operate both the valve 46 and the throttle so that simultaneous operation is obtained. A feature of the check valve 51 is that oil once delivered to the cylinder will not be discharged back through the piping. Thus it has to be used and is thereby forced to perform its function.

The modification shown in Figs, 6 and 7 is merely for the purpose of placing the oil between the cylinder and piston surfaces in a more accurately or uniformly distributed manner in accordance with the pressure existing between the various portions of the operating cylinder and piston surfaces. Further description of the operation of this modification is deemed unnecessary in view of that which has already been given in describing the construction thereof.

Having thus described my invention what I claim is:

1. A lubricating system for multi cylinder engines comprising a source of oil supply, a pump connected with and adapted to withdraw oil from the source of supply, a manifold connected with and adapted to receive oil from the pump, a connection from the manifold to each of the engine cylinders, adapted to deliver oil to and between the walls of the cylinder and the piston, a connection from the manifold to the source of supply, a valve in the manifold adapted to control the flow of oil through the cylinder connections and through the manifold to source connection, a separate valve in each manifold to cylinder connection to proportion the amount of oil fed to each cylinder, and an automatic by-pass valve in the manifold adapted to regulation to assist the first mentioned valve in governing the pressure and total amount of oil fed to the coacting cylinder and piston surfaces through the manifold to cylinder connections.

2. A lubricating system for multi cylinder engines comprising a source of oil supply, a pump connected with and adapted to withdraw oil from the source of supply, a manifold connected with and adapted to receive oil from the pump, a connection from the manifold to each of the engine cylinders, adapted to deliver oil to and between the walls of the cylinder and the piston, a connection from the manifold to the source of supply, a valve in the manifold adapted to control the flow of oil through the cylinder connections and through the manifold to source connection, a separate valve in each manifold to cylinder connection to proportion the amount of oil fed to each cylinder, and an automatic by-pass valve in the manifold adapted to regulation to assist the first mentioned valve in governing the pressure and total amount of oil fed to the coacting cylinder and piston surfaces through the manifold to cylinder connections.

3. A lubricating system for multi cylinder engines comprising a source of oil supply, a pump connected with and adapted to withdraw oil from the source of supply, a manifold connected with and adapted to receive oil from the pump, a connection from the manifold to each of the engine cylinders, a connection from the manifold to the source of supply, a valve in the manifold to control the flow of oil through the cylinder connections and manifold to source connections, a separate valve in each manifold to cylinder connection to proportion the amount of oil fed to each cylinder, an automatic by-pass valve in the manifold to assist the first mentioned valve in governing the pressure and amount of oil to the cylinder and piston surfaces, and means at the point of connection of the manifold to cylinder connection to distribute oil proportionately to the piston to cylinder surfaces according to bearing pressures therebetween.

In testimony whereof I hereunto affix my signature.

OTTO MILLER.